Jan. 8, 1946. R. N. GRIESHEIMER 2,392,662
VISCOSIMETER
Filed March 26, 1942 2 Sheets-Sheet 2
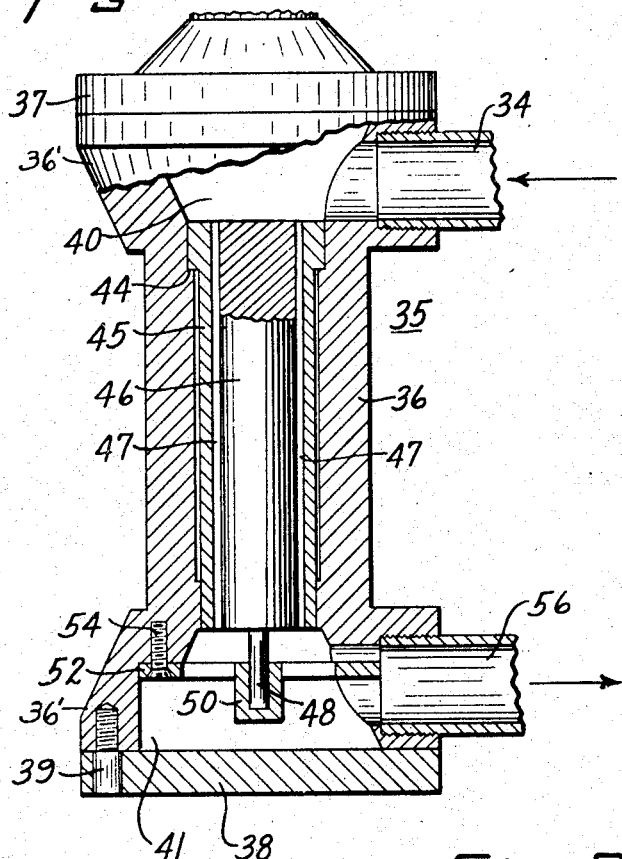
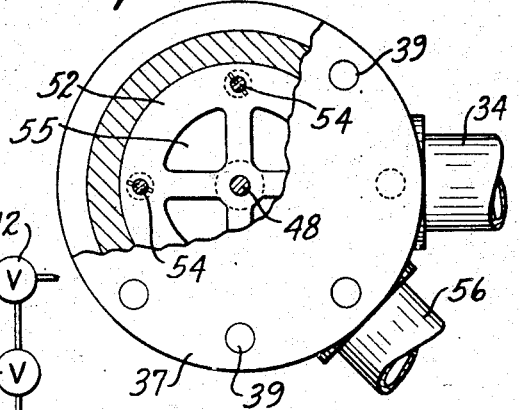
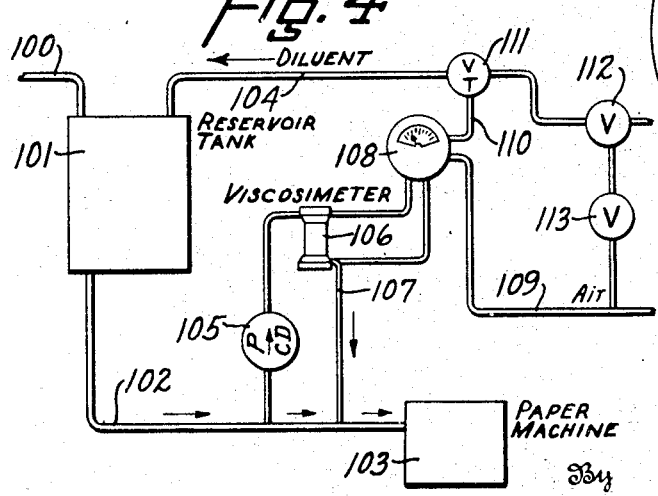
Inventor
Rudolph N. Griesheimer
By Marechal & Noe
Attorneys Patented Jan. 8, 1946

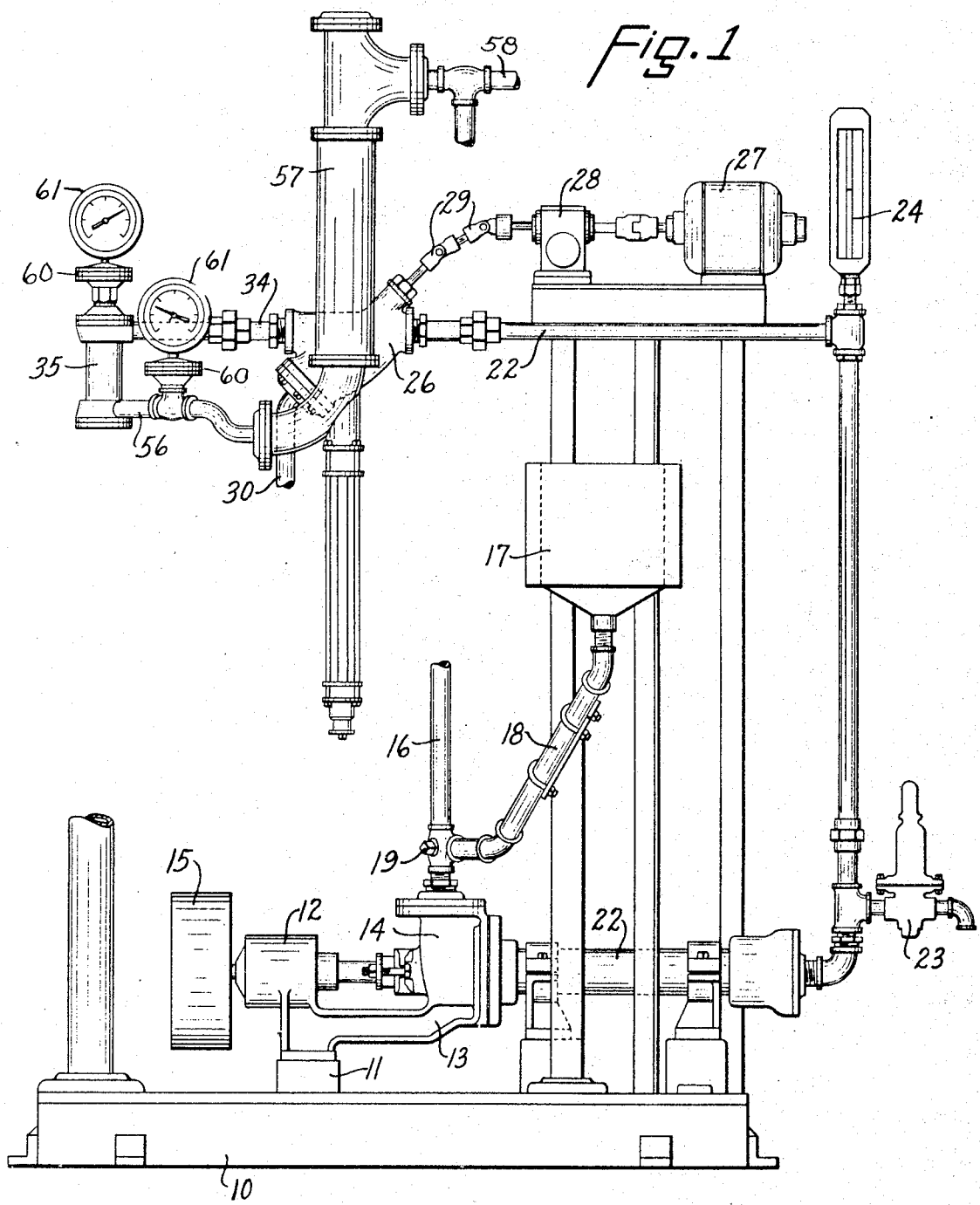

2,392,662

UNITED STATES PATENT OFFICE 2,392,662

VISCOSIMETER

Rudolph N. Griesheimer, Chillicothe, Ohio, assignor, by mesne assignments, to K-C-M Company, Dayton, Ohio, a corporation of Delaware Application March 26, 1942, Serial No. 436,371

4 Claims. (Cl. 73—54)

This invention relates to viscosimeters.

It is the principal object of the invention to provide a direct reading viscosimeter, free of moving parts, which through simple pressure measurements provides a direct measurement of viscosity, and which is readily adaptable for use in automatically controlling and maintaining a predetermined viscosity in a liquid.

It is a further object to provide a viscosimeter particularly adapted for use with fluids of a dilatant or thixotropic nature which is accurate and reliable in operation, and in which the viscosity is measured at a definite rate of shear.

It is a still further object to provide a viscosimeter which provides for simply and accurately determining and regulating the viscosity of a fluid under a predetermined high rate of shear comparable with that to which the fluid is subjected in use.

Other objects and advantages will be apparent from the accompanying drawings, the following description and the accompanying claims.

In the drawings,

Fig. 1 is an elevational view showing an installation for supplying fluid to a desired location in which a viscosimeter provides for measuring, recording, and regulating the viscosity of the fluid being handled.

Fig. 2 is a broken view partially in elevation and partially in section through the instrument itself;

Fig. 3 is a view partially in section and partially in plan of the instrument of Fig. 2; and Fig. 4 is a diagrammatic view showing the application of the instrument to continuous regulation of viscosity.

Heretofore considerable difficulty has been encountered in attempting to measure, record, or regulate the viscosity of a liquid under high rates of shear, i. e., rates of shear well above the usual rates of approximately 15 to 25 reciprocal seconds and up to as high as 200 reciprocal seconds or above. This difficulty is more particularly encountered in connection with liquids which are either dilatant or thixotropic in their characteristics and which it is desired to test under high rate of shear conditions. In certain operations, such for example as in the handling of coating compositions, and the application thereof on coating presses in the manufacture of paper, it is desirable to measure and accurately control the viscosity of such coating composition to thereby secure greater uniformity and superior quality in the finished product. Few liquids, however, exhibit true Newtonian characteristics, and in most cases the liquids are either dilatant or thixotropic, i. e., their viscosities increase or decrease depending upon the rate of shear to which the liquid is subjected. In the case of the coating compositions of the character used in the manufacture of paper, it has been found that such compositions are usually thixotropic, and unless the viscosity of such a composition is measured and regulated under conditions comparable with those occurring in the fluid at its actual point of application, the proper viscosity characteristics will not be secured with certainty. It is found, however, that through the practicing of the present invention the condition of shearing rate which obtains in the zone of the coating press may be reproduced and that when the viscosity under these conditions is measured and predetermined to be within a desired range, then greater uniformity and improved results are obtained in the actual application of such compositions to the paper sheet. While not limited to the treatment of any particular composition, the present invention will be described for illustrative purposes with relation to the handling of a coating composition such as that used in the manufacture of paper, from which it will be apparent that the invention is similarly of value in connection with the handling of other compositions either of a thixotropic nature or of a dilatant nature.

In accordance with the present invention there is provided a viscosimeter in which a fluid composition may be tested and regulated under desired conditions of shearing rate, and in which such shearing rate may be accurately and easily predetermined and maintained at a desired value. Such value may be selected to be a low rate of shear, or may be increased to a high range, substantially beyond the range now attainable with other available viscosimeters. The device embodies no moving parts in the measuring portion of the instrument, and the measurements are determined entirely on the basis of pressure indications, so that great accuracy and simplicity result.

The drawings show a preferred embodiment of the invention illustrated with reference to an arrangement for measuring and controlling the viscosity of a coating composition such as that used in the coating of paper. In such composition when applied with the usual roll coating press, it is found that a condition of high rate of shear is produced in the coating material immediately at the zone of application, and it becomes important to maintain the viscosity of the composition under such high shearing rates within a substantially narrow range. The apparatus illustrated therefore is representative of one in which provision is made for measuring and regulating the viscosity of a thixotropic fluid under high rate of shear conditions, such as up to several hundred reciprocal seconds. As previously indicated, the invention is equally applicable in the handling of dilatant compositions, and in providing for accurate measurement and control under both relatively low and even higher rates of shear.

The machine base is shown at 10 on which is mounted a pedestal 11 supporting bearing 12 and having an extended projecting portion 13 on which is mounted a pump 14. The pump is of such character as to provide for maintaining a substantially constant rate of flow of liquid therethrough; preferably it consists of a Moyno positive displacement screw type pump, having a plurality of stages, to provide for positive feeding action of the liquid at definite and constant velocity when driven at constant speed.

A pulley is shown at 15 which may be driven from a suitable source of power preferably through a variable speed drive such as a Reeves type drive, to provide for properly controlling the speed of operation.

The fluid is supplied to the pump from the make-up chest by means of pipe 16, a reservoir 17 is provided and material may likewise be fed from it through pipe 18 to a three-way valve 19, controlling the inlet to the pump.

A discharge conduit 22 leads from the delivery side of the pump and there is preferably connected to this conduit a pressure relief valve indicated at 23 which will open in the event of stoppage of flow through conduit 22 to avoid building up a dangerous pressure with the positive displacement pump.

A thermometer 24 may be included for measuring the temperature of the fluid, the line 22 then delivering the fluid into a suitable strainer 26 for the purpose of removing any lumps or oversize particles. Preferably such strainer is of the rotary type, being driven by an auxiliary power source 27, driving through a reduction gear 28, and universal joint 29 to rotate the movable strainer element, thereby clearing the strainer of any collected lumps or particles, the latter being discharged through the line 30.

A conduit 34 supplies the strained and cleaned liquid under constant velocity into the viscosimeter instrument indicated generally by numeral 35. As shown in Fig. 2, the instrument comprises a shell 36 generally cylindrical in its central portion and provided with open frusto-conical end portions 36'. An upper end cap 37 and a lower end cap 38 are fastened to the shell over the respective end portions by means of a series of studs 39, thereby forming a pressure inlet chamber 40 at the upper end, and a pressure outlet or discharge chamber 41 at the lower end.

Inwardly, the shell 36 is bored and provided with a shoulder 44 to serve as a seat for a cylindrical sleeve 45 which extends the length of the central cylindrical portion of the shell. Coaxial with sleeve 45 and located inwardly thereof is a cylinder 46 of somewhat less outer diameter than the inner diameter of cylinder 45 such that an annular space 47 is left between the two cylindrical surfaces, this space providing an annular orifice through which the composition is passed. Cylinder 46 carries a depending pin or extension 48 which is adapted to be received in a recessed bearing 50 formed in a spider 52 which in turn is bolted into the shell 36 by means of bolts 54. The spider has openings 55 formed therein to provide for the free passage of the fluid therethrough, and as cylinder 46 in operation tends to maintain itself in a position of uniform clearance with respect to sleeve 45, the principal function of the spider is merely to support the inner cylinder against the thrust load caused by the passage of the fluid through space 47 under pressure. A discharge conduit 56 communicates with the lower pressure chamber 41 to discharge the liquid therefrom.

While the construction has been described as being cylindrical in shape, it may also be constructed to have a shape other than cylindrical, the annular space 47 being either arcuate and non-cylindrical, or of polygonal cross-section.

Following passage through the instrument, the fluid discharges through conduit 56 which leads to a flow meter 57 which is of the positive displacement or nutating piston type, or as shown the Stabl-Vis Rotameter type, such that its indications are practically unaffected by changes in the viscosity of the fluid. By observation of the flow meter the velocity of flow may be determined and the drive adjusted to maintain a constant velocity.

The discharge from the flow meter is delivered by conduit 58 to the machine chest or other suitable collecting tank to be used along with the main body of the composition.

Means are provided for measuring the pressure of the liquid in each of chambers 40 and 41. As shown a pressure diaphragm 60 is mounted adjacent each chamber and has communication therewith so that it is responsive to the pressure condition therein, a suitable indicating dial 61 being provided to indicate the respective pressures on the diaphragms. If desired, the instrument may comprise a combined instrument directly indicative of or responsive to the pressure differential between the two chambers. The latter instrument is preferably used in conjunction with the control of the addition of a diluent to the composition, in order to maintain a predetermined condition of viscosity therein.

In the construction above described there are certain important relationships to be observed. The shearing stress exerted on the fluid is a function of the product of the viscosity of the fluid and the rate of shear. Such rate of shear, under conditions of constant velocity of flow, is dependent upon the geometry of the particular viscosimeter, that is, upon the inner and outer radius of the annular space between the two stationary cylinders. The shearing stress within the fluid is balanced by a pressure difference between the inlet chamber 40 and the discharge chamber 41. The relationships may be determined mathematically as follows:

Thus if $r$ is the radial distance from the axis of the cylinders to a point in the annular space 47, $2\pi r dr$ is the area of a small circular lamina in that region. If $v$ is the velocity of the fluid at this point $r$, then the over-all velocity of flow of the fluid V can be found by integration of $2\pi rvdr$ through the region between the two cylinders. This is found to be a function of the geometry or physical constants of the two cylinders, and to vary directly as the pressure difference and inversely as the viscosity.

Using the following symbols

V=flow rate in cc. per second passed between the cylinders.

$v$=velocity of fluid at any radial distance $(r)$ from the axis line of the cylinders in cm. per second.

$\left(\dfrac{dv}{dr}\right)_A$ =average rate of shear in the orifice region in reciprocal seconds.

$\mu$=fluid viscosity in poises.

$p_1 - p_2$ = pressure drop across the cylinders in dynes per square cm.
$l$ = length of cylinders in cm.
$b$ = radius of outer cylinder in cm.
$a$ = radius of inner cylinder in cm.
$\log_e$ = log to base $e$ or natural base.

The final equations may be written as follows:

$$v = \frac{(P_1-P_2)}{4\mu l \log_e \frac{b}{a}}\left[(b^2-r^2)\log_e \frac{r}{a} - (r^2-a^2)\log_e \frac{b}{r}\right] \quad (1)$$

$$V = \frac{\pi(P_1-P_2)}{8\mu l}(b^2-a^2)\left[b^2+a^2-\frac{b^2-a^2}{\log_e \frac{b}{a}}\right] \quad (2)$$

Rewriting this equation in terms of the viscosity, we have $$\mu = \frac{\pi(P_1-P_2)}{8Vl}(b^2-a^2)\left[b^2+a^2-\frac{b^2-a^2}{\log_e \frac{b}{a}}\right] \quad (3)$$

By differentiating Equation 1 with respect to $r$ to obtain an expression for the rate of shear $$\left(\frac{dv}{dr}\right)$$

at the point $r$, it is then possible to determine the average rate of shear by a well known calculus procedure, the average rate of shear $$\left(\frac{dv}{dr}\right)_A$$

being as follows:

$$\left(\frac{dv}{dr}\right)_A = \frac{2V}{\pi(b+a)\left[b^2+a^2-\frac{b^2-a^2}{\log_e \frac{b}{a}}\right]} \quad (4)$$

And by substitution to derive an expression in terms of pressure differences, there is obtained the following equation:

$$\frac{P_1-P_2}{l} = \frac{4\mu}{b-a}\left(\frac{dv}{dr}\right)_A \quad (5)$$

This equation may be rewritten as follows:

$$P_1-P_2 = \frac{4l\mu}{b-a}\left(\frac{dv}{dr}\right)_A \quad (6)$$

from which $$\mu = \frac{(P_1-P_2)(b-a)}{4l\left(\frac{dv}{dr}\right)_A} \quad (7)$$

From the above it will be seen that the viscosity is a direct function of the pressure difference, at a constant rate of shear and that the rate of shear is itself directly dependent upon the velocity. Thus by maintaining a constant predetermined velocity, the pressure difference is a direct measurement of the viscosity of the fluid. By providing an instrument sensitive to pressure differences, and causing that instrument to control the flow of one or another of the components of the composition, such as the supply of dilution water added to the coating composition, or the addition of a thickening material, the composition may be continuously supplied in a condition of regulated viscosity at a predetermined definite rate of shear. Such rate of shear is preferably selected to be comparable with that which occurs at the place and under the conditions at which the composition is applied to the paper sheet.

The above mathematical expressions will likewise indicate the manner in which the viscosimeter may be constructed for any particular flow rates, pressure differences, rates of shear, and range of viscosities. It is first determined, on the basis of the material to be handled, whether such material is thixotropic, dilatant, or a true Newtonian fluid, and the conditions under which the fluid is to be used, as to approximate rate of shear in the final application, are likewise approximately determined.

In the case of the coating composition for use in coating paper, such composition is thixotropic, and under the conditions of application to the paper, it is subject to a relatively high shearing rate, of several hundred reciprocal seconds. Accordingly, in constructing a viscosimeter for such use, a shearing rate of this order is adopted.

By reference to Equation No. 4 it will be seen that a number of different combinations of $V$, $b$ and $a$ will give the desired rate of shear. Also by reference to Equation No. 5, and with the approximate value of the viscosity of the fluid under test being known, the pressure drop is made to be within a proper range for the instruments available, and with that range selected, an approximate value of $b$ and $a$ may be easily determined. Thereafter, with a selected range of dimensions for $b$ and $a$, the values of $V$ and $a$ and $b$ are additionally considered and selected to be such as to satisfy both of Equations 4 and 5.

It will also be apparent from the above that the pressure difference is directly proportional to the cylinder geometry, assuming a constant flow rate. Varying the flow rate or cylinder length changes the value of the conversion factor relating the pressure drop to poises of viscosity. It is also important to note from Equation 4 that a change in flow rate will likewise change the testing rate of shear. For that reason the instrument includes both a positive displacement pump operating at constant speed, and a flow meter to determine that such flow is held constant.

From Equation 7 it will appear that at constant velocity of flow and hence constant average rate of shear, the pressure difference as determined by instrument 62 is a direct measure of the viscosity of the fluid at that rate of shear condition.

As a specific example of an instrument for use with such composition for coating paper, the pump is driven to supply the composition, sampled from the main supply tank, to the viscosimeter at a velocity of flow of approximately five gallons per minute. The inner radius of cylinder 45 (dimension $b$) is 0.4040 in. and the outer radius of cylinder 46 (dimension $a$) is 0.4528 in., leaving an annular space 0.0488 in. in width. The length of the annular space is 4.250 in. This is found to produce in operation a pressure difference of the order of 50 to 75 pounds per square inch, the composition under a shearing rate of 200 reciprocal seconds having an apparent viscosity of 110 to 170 centipoises, or 1.10 to 1.70 poises.

The theoretical values and computations above discussed may be verified by passing a calibrating fluid of known viscosity through the instrument, and then calculating its viscosity from these measurable quantities. In such comparisons the calculated viscosities have corresponded quite closely to the known values of viscosity. Glycerol-water solutions whose viscosities are known in terms of temperature and specific gravity are very useful for this purpose. It is also advisable to check the instrument from time to time in this way to determine that no objectionable wear of either surface defining the annular space has occurred which would affect the calibration.

The invention provides for automatic control of the viscosity of a composition to maintain a predetermined viscosity at a definite rate of shear. Fig. 4 shows such an arrangement diagrammatically, where the coating composition or color is supplied from the color preparation room by line 100 and discharged into tank 101 from which the main supply 102 goes to the paper machine coating press 103, suitable pumping mechanism being provided as required. The composition as supplied to tank 101 is purposely too thick and a supply of dilution water leads into the tank through line 104, suitable agitators or mixers being located in the tank to secure uniform incorporation.

The constant delivery pump 105 withdraws a sample from line 102 and supplies it at constant velocity to the viscosimeter 106, the discharged liquid being returned by pipe 107 to the tank line 102 for delivery to the press 103. The viscosimeter, operating as above described, measures the viscosity of the composition at a definite rate of shear and upon an increase in the viscosity above the desired level, the differential pressure is increased and is made to operate the differential pressure device 108, indicated as a single instrument responsive to the difference of the two pressures, which has a valve in air supply line 109 to supply air through line 110 to a throttling control valve 111 in water line 104. The valve 111 is preferably normally open and is closed to a regulated degree upon application of a predetermined air pressure. Valve 111 upon opening permits water to flow into the tank 101 at a greater rate, thereby reducing the viscosity of the composition to the proper value. Thereafter the viscosimeter responds to the lower viscosity, and the air pressure is applied to control valve 111 so that the rate of supply of liquid is reduced. Thus the rate of supply of diluting water is controlled in relation to the excess viscosity over the predetermined desired amount. If desired additional safety valves may be incorporated to protect the system against failure of the air supply, or the like, including a normally closed valve 112 and a manual control valve 113 which normally supplies air thereto to retain the valve open but which can be closed to remove air pressure and thereby stop the flow of diluent.

The device of this invention thus embodies no moving parts in the instrument itself, and provides for measurement of the viscosity conditions by means of simple and accurate pressure indicators or recorders. The range of the instrument may be changed quite readily through the provision of additional combinations of inner and outer cylinders, such cylinders providing annular orifices of different cross-section and length, to properly cover the range of pressures, velocities and viscosities of the fluid to be tested. In a period of use, the instrument has been found to be highly reliable, and to afford great accuracy of measurement in the regulation and control of viscosity under predetermined rate of shear conditions.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A viscosimeter of the character described comprising coaxial inner and outer members in predetermined fixed relation to each other leaving a continuous annular space between said members of predetermined small dimensions, a pressure chamber at either end of said members in communication with said space, means for introducing fluid to be measured to one of said pressure chambers at constant velocity, means for discharging the fluid from the other of said chambers, and means for measuring the pressures in both said chambers and determining the pressure difference as a measure of the viscosity of the fluid.

2. A viscosimeter of the character described for measuring the viscosity of a liquid under a predetermined rate of shear comprising a pair of concentric cylinders, means for supporting said cylinders in fixed relation one within the other leaving an annular space therebetween of predetermined small dimensions, means forming a pressure chamber at each end of said cylinders, means for introducing fluid to be measured to one of said pressure chambers under constant velocity of flow, means for discharging the fluid from the other of said chambers after its passage through said annular space, and means for measuring the pressure difference in said chambers as a measure of the viscosity of said liquid at said predetermined rate of shear.

3. A viscosimeter of the character described providing a direct linear indication of the viscosity of a liquid under a predetermined high rate of shear comprising a pair of fixed concentric bodies one within the other and spaced from each other so as to form an annular passage therebetween of predetermined small cross-sectional area and length, a pressure chamber communicating with each end of said space, means for supplying the fluid at constant velocity into one of said pressure chambers for travel through said annular passage to establish predetermined rate of shear conditions, means for discharging said fluid from the other of said pressure chambers, and means responsive to the pressure difference in said chambers providing a direct linear indication of the viscosity of said fluid under said rate of shear conditions.

4. A viscosimeter of the character described providing a direct linear indication of the viscosity of a liquid under a predetermined high rate of shear comprising a pair of concentric cylinders, means for supporting said cylinders in fixed relation one within the other leaving an annular space therebetween of predetermined small dimensions, means forming a pressure chamber at each end of said cylinders and in direct communication with the opposite ends of said annular space respectively, means for introducing fluid to be measured to one of said pressure chambers under predetermined uniform velocity of flow for travel through said annular space to establish predetermined uniform rate of shear conditions, means for discharging the fluid from the other of said chambers after passage through said annular space, and means for measuring the pressure difference in said chambers as a direct linear measure of the viscosity of said liquid at said predetermined rate of shear.

RUDOLPH N. GRIESHEIMER.